United States Patent Office 3,368,994
Patented Feb. 13, 1968

3,368,994
LEAK INDICATING MISSILE FINISH
Arthur Stander, Philadelphia, Pa., assignor to the United States of America as represented by the Secretary of the Navy
No Drawing. Continuation-in-part of application Ser. No. 334,052, Dec. 27, 1963. This application Aug. 2, 1966, Ser. No. 570,142
1 Claim. (Cl. 260—31.8)

ABSTRACT OF THE DISCLOSURE

The subject invention relates to an improved composition which is applied to the exterior surface of a rocket motor fuel container and which detects leakage of the contents of the container by means of a change in its color. The ingredients of the improved composition include titanium dioxide, a resinous vehicle such as a methyl methacrylate polymer, the color indicates phenolphthalein and diphenylbenzidine which respectively change color in the presence of an amine fuel and red fuming nitric acid, the plasticizer butyl benzyl phthalate, and a suitable solvent.

---

The invention described herein may be manufactured and used by or for the Government of the United States of America for governmental purposes without the payment of any royalties thereon or therefor.

This is a continuation-in-part of patent application, Ser. No. 334,052 filed Dec. 27, 1963 and now abandoned.

This invention relates to an improved coating composition in the nature of a paint adapted to be applied to the exterior surface of liquid fuel propelled aircraft launched missiles. More specifically, my coating by virtue of inherent color changes is particularly effective in providing a means for visually identifying the location of a leak even though the liquid propellant may be escaping through only a minute aperture imperceptible to the naked eye.

A liquid propulsion system for a rocket motor consists of a fuel component such as a mixed amine fuel and an oxidizing component such as red fuming nitric acid. The two liquids are stored in separate sections within the motor. These sections are separated by suitable means to enable the two liquids to be brought into contact with one another to produce a chemical reaction which detonates the motor to drive the rocket. Because of the relatively high pressures involved and the corrosive nature of the chemical products, leakage of the liquid components in minute cracks in the motor encasement frequently occurs. Previously, there was no suitable means for immediately determining whether a leak had occurred either in the mixed amine fuel compartment or in the red fuming nitric acid compartment of the rocket motor.

Accordingly, it is one object of the present invention to provide an indicator for selectively detecting the leakage of either the mixed amine fuel component or the red fuming nitric acid oxidizing component from a liquid propulsion system which may be readily utilized without specific treatment beforehand or development afterward and which will be highly stable regardless of varying temperature and humidity conditions, and upon leakage of either liquid component will give a trace or record of desirable dark color and contrast which will have superior permanency.

Another object is to provide a coating composition which may be readily applied to a metal surface, which will be non-cracking and which will not flake or peel off when the temperature of the surface exceeds 525° F.

A further object is to provide a coating composition which will resist any contamination by hydraulic fluids and which is effective in detecting propellant leaks through minute openings.

Other objects and advantages will appear in the more detailed description set forth hereinbelow, it being understood, however, that this more detailed description is given by way of illustration and explanation only, and not by way of limitation, since various changes therein may be made by those skilled in the art without departing from the scope and spirit of the present invention.

In accordance with the present invention, there is provided a composition of matter which, when applied as a coating on the rocket motor imparts a uniform white finish thereto. Where a leak occurs, the mixed amine fuel or the red fuming nitric acid causes a substance having a color differing from the uniform white shade of the original composition to be deposited on the surface of the coating, thereby providing a distinctly contrasting color or shade at the point of leakage. The deposited substance forms colored rings or spots immediately over the leak and remains there permanently until removed so that an examination for leakage can be made at any time. The coating is not affected by high humidity nor by temperatures well in excess of 400° F., i.e., the constituents of the coating retain their stability at such elevated temperatures.

I have proposed to incorporate a combination of colorless indicators consisting of diphenylbenzidine and phenolphthalein into a plasticized acrylic vehicle wherein the diphenylbenzidine turns blue when contacted by red fuming nitric acid and the phenolphthalein turns red when contacted by the mixed amine fuel. The idea is simple but it has not been satisfactorily accomplished in the past due to the difficulty of incorporating these indicators into a suitable paint vehicle. Thus, for example, when these indicators were incorporated into an alkyd vehicle, the finish would not dry properly. Polyamide-epoxy combinations turn pink soon after application, polyurethanes gel on storage and nitrocellulose containing finishes darken soon after application.

In a preferred form of the present invention, there is provided an intimate mixture of a material such as powdered titanium dioxide, phenolphthalein, diphenylbenzidine, and an acrylic vehicle incorporating butyl benzyl phthalate as a plasticizer therefor. The acrylic vehicle is one selected from the group consisting of methyl methacrylate polymer, ethyl methacrylate polymer and methyl N-butyl methacrylate polymer, each of which is resistant to hydraulic oils. The color of the resulting mixture is white because of the presence of the titanium dioxide. To enable application of the composition to the surface of the missile being leak tested by conventional methods such as brushing, dipping or spraying, a solvent, being one selected from the group consisting of toluene, xylene and butanol is added to the mixture to form a suspension thereof, the amount of the solvent depending upon the consistency desired in the suspension. When the solvent suspension of the mixture is applied to the surface, the solvent evaporates and an adherent coating of the mixture remains on the surface. Although the proportions of the constituents of the composition of the present invention are not critical, it is desirable that the constituents be present in the mixture in the range of 10-20 parts by weight of titanium dioxide, 50-75 parts by weight of the acrylic vehicle, 4-7 parts by weight of butyl benzyl phthalate, 3-5 parts by weight of phenolphthalein and 0.05-0.02 parts by weight of diphenylbenzidine. The amount of solvent added to form the suspension may be 20-50 parts by weight.

Within the foregoing ranges of constituents, one mixture which gave excellent results comprised 15 parts by weight of titanium dioxide, 4 parts by weight of butyl benzyl phthalate and 65 parts by weight of methyl methacrylate polymer, the molecular weight of said polymer being such that a 30% solution of said polymer in toluene has a viscosity of 235–365 centiposes at 30° C. The mixture is readily accomplished by intimately mixing the constituents in a mortar or ball mill. The mixture is then agitated in about 35 parts by weight of toluene to form the suspension.

This coating is sprayed over the surface of a missile. It will dry quickly to a gloss white finish. A leak of the mixed amine fuel component causes the finish to turn red and a leak of the red fuming nitric acid causes the finish to turn blue.

Obviously, many modifications and variations of the present invention are possible in the light of the above teachings. It is therefore to be understood that within the scope of the appended claim, the invention may be practiced otherwise than as specifically described.

I claim:

1. A composition for application as a permanent coating to the exterior surface of a rocket motor containing a mixed amine fuel component and a red fuming nitric acid oxidizing component and through which surface said amine fuel and said red fuming nitric acid may leak, which when applied as a coating and dried will be resistant to hydraulic fluids, high atmospheric humidity and temperatures to which it may be exposed, and which when so applied will clearly indicate the existence and location of any such leak that may subsequently develop, which consists essentially of the following constituents.

| Constituent: | Parts by weight |
| --- | --- |
| Phenolphthalein | 3–5 |
| Diphenylbenzidine | 0.05–0.2 |
| Titanium dioxide | 10–20 |
| Butyl benzyl phthalate | 4–7 |
| A methyl methacrylate polymer having a molecular weight such that a 30% solution of the polymer in toluene has a viscosity of 235–365 centipoises at 30° C. | 50–75 |
| Toluene | 20–25 |

References Cited

UNITED STATES PATENTS 2,845,394    7/1958    Thompson    252—408
2,934,510    4/1960    Crissey et al.    260—31.8
2,943,475    7/1960    Benveniste et al.    260—40

OTHER REFERENCES

Horn: Acrylic Resins; Reinhold Publishing Corp., 1960, pp. 142, 143.

Rosin: Reagent Chemicals and Standards; D. Van Nostrand Company, Inc.; 4th ed., 1961, pp. 165, 300, 301.

MORRIS LIEBMAN, *Primary Examiner.*

L. T. JACOBS, *Assistant Examiner.*